United States Patent
Kwan et al.

(10) Patent No.: US 10,492,280 B1
(45) Date of Patent: Nov. 26, 2019

(54) INTEGRATING WIRELESS CONTROLLER AND A LINEAR DRIVER FOR LED CONTROL

(71) Applicant: WiSilica Inc., Laguna Hills, CA (US)

(72) Inventors: Dennis Ching Chung Kwan, San Diego, CA (US); Suresh Kumar Singamsetty, Aliso Viejo, CA (US); Francis Antony, Kerala (IN)

(73) Assignee: WiSilica Inc., Laguna Hills, CA (US)

( * ) Notice: Subject to any disclaimer, the term of this patent is extended or adjusted under 35 U.S.C. 154(b) by 0 days.

(21) Appl. No.: 16/159,392

(22) Filed: Oct. 12, 2018

(51) Int. Cl.
    *H05B 33/00* (2006.01)
    *H05B 37/02* (2006.01)
    *H04B 10/524* (2013.01)
    *H05B 33/08* (2006.01)

(52) U.S. Cl.
    CPC ....... *H05B 37/0272* (2013.01); *H04B 10/524* (2013.01); *H05B 33/0845* (2013.01); *H05B 33/0857* (2013.01)

(58) Field of Classification Search
    CPC ............ H05B 33/0815; H05B 33/0818; H05B 33/0848; H05B 33/0863; H05B 33/089; H05B 37/0263; H05B 37/0272; H05B 33/0827; H05B 33/0845; H05B 33/0851; H05B 33/086; H05B 37/0254; H05B 33/0842; H05B 33/0866; H05B 33/0887; H05B 37/02; H05B 33/0803; H05B 33/0812; H05B 33/0854; H05B 33/0869
    See application file for complete search history.

(56) References Cited

U.S. PATENT DOCUMENTS

| 2014/0176016 A1* | 6/2014 | Li | H05B 33/0803 |
|---|---|---|---|
| | | | 315/307 |
| 2015/0237700 A1* | 8/2015 | Woytowitz | H05B 33/0863 |
| | | | 315/307 |

* cited by examiner

*Primary Examiner* — Monica C King
(74) *Attorney, Agent, or Firm* — Rowan TELS LLC

(57) ABSTRACT

A system integrates a wireless controller into a linear, alternating current-only driver. The system utilizes a light emitting diode driver to maintain a constant current to a light emitting diode when a current controller is operated by a pulse width modulated signal. The pulse width modulated signal to one or more light emitting diode circuits may be modified to reduce flicker, color mix, and temperature tune.

20 Claims, 9 Drawing Sheets

INTEGRATING WIRELESS CONTROLLER AND A LINEAR DRIVER FOR LED CONTROL

BACKGROUND

Conventional light-emitting diode (LED) drivers comprise two types: wireless-controlled LED drivers and linear LED drivers. The wireless-controlled LED drivers convert alternating current (AC) to direct current (DC), which is then utilized to interface with the wireless control logic. The linear LED driver comprises linear LEDs and do not incorporate an AC to DC conversion. As such, the linear LED driver does not incorporate wireless control. As wireless control of LED drivers may reduce resources needed to operate a LED driver and AC to DC conversion either may not be able to be provided or may utilize increased resources, a linear LED driver that may be controlled wireless with AC only may reduce resources needed to provide a similar operation.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
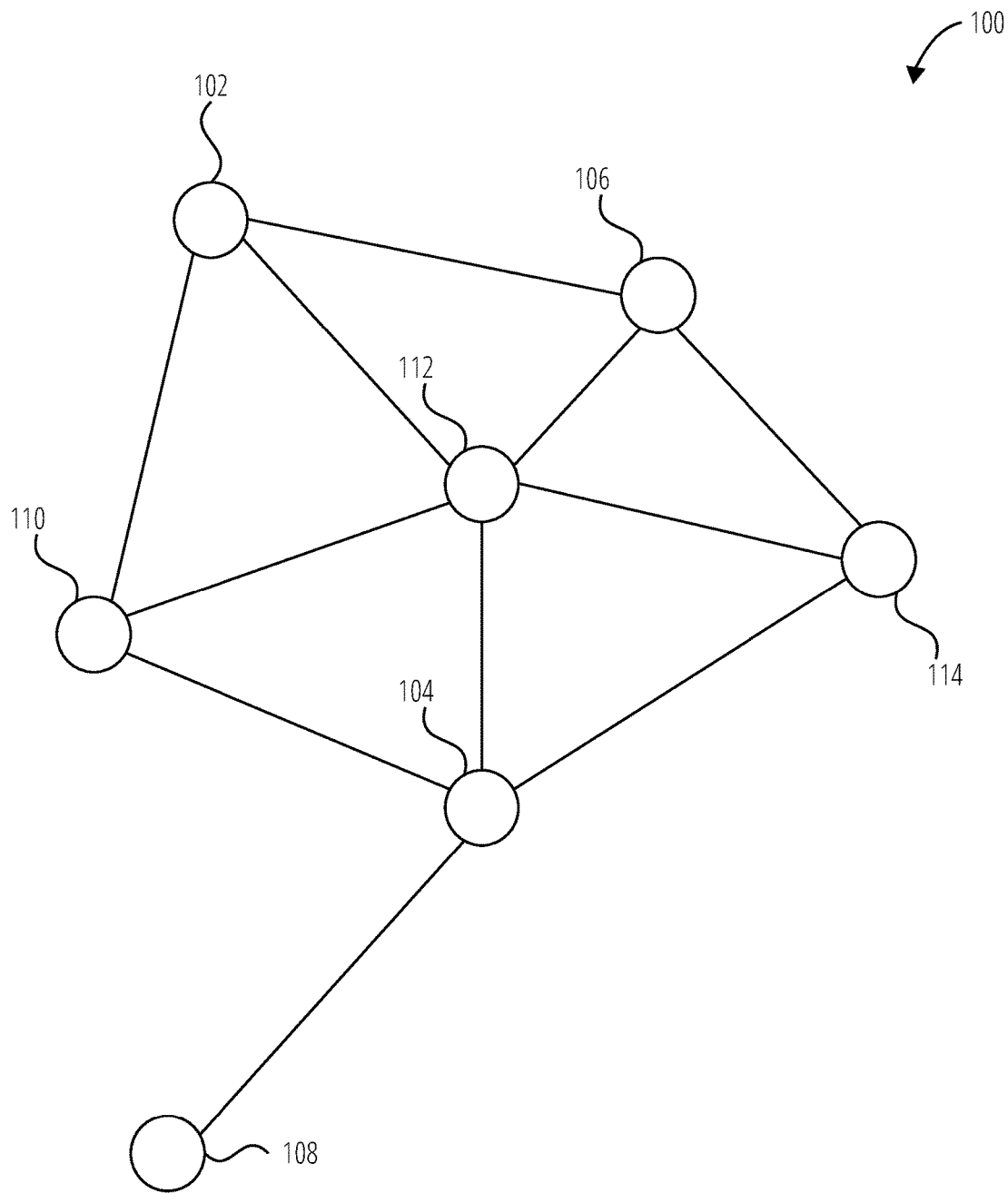
FIG. 1 illustrates an embodiment of a wireless mobile mesh network 100.

Referring to FIG. 1, an embodiment of a wireless mobile mesh network 100 includes a server node 102, a router node 110, a router node 112, a router node 106, a router node 104, a gateway node 114, and a gateway node 108. The server node 102, the gateway node 114, and the gateway node 108 also operate as router nodes. Every node in the network participates in the routing of communications in the wireless mobile mesh network 100. The gateway node 114 and gateway node 108 provide an interface between the wireless mobile mesh network 100 and an external network, such as the Internet or a local area network. The server node 102 provides some level of centralized management for the wireless mobile mesh network 100, and may be optional if each node acts autonomously to self-manage. One or more of the nodes may be fixed in location, some of the nodes may be mobile, or all of the nodes may be mobile.

Figure 2:
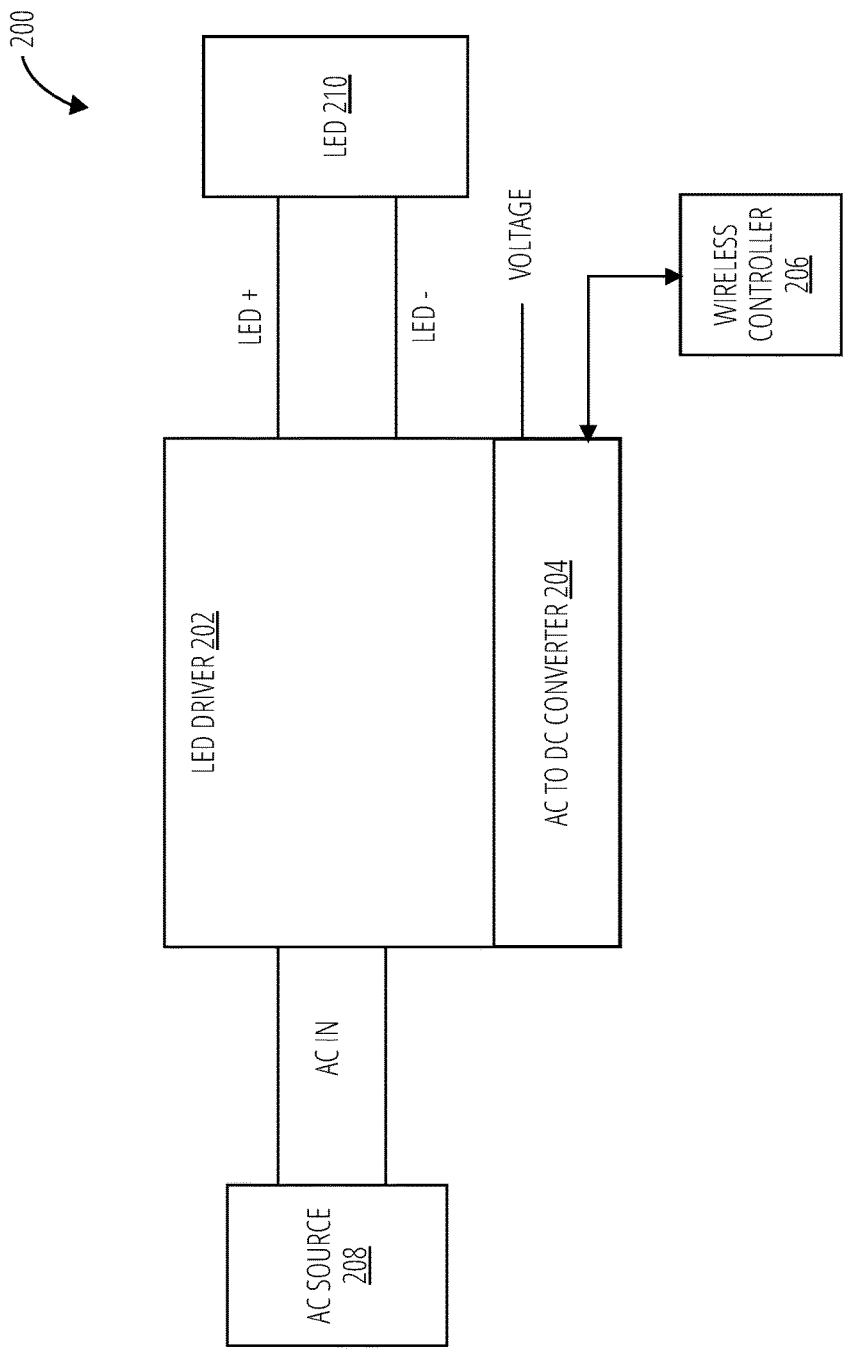
FIG. 2 illustrates an embodiment of a conventional wireless LED driver system 200.

Referring to FIG. 2, the conventional wireless LED driver system 200 comprises an LED driver 202, an AC to DC converter 204, a wireless controller 206, an AC source 208, and an LED 210.

The LED driver 202 receives alternating current from the AC source 208 and transmits the alternating current to the LED 210. The LED driver 202 comprises the AC to DC converter 204, which converts the alternating current to direct current. The wireless controller 206 communicates with the AC to DC converter 204 to alter the operation of the LED driver 202, which controls the current, and thus operation, to the LED 210.

Figure 3:
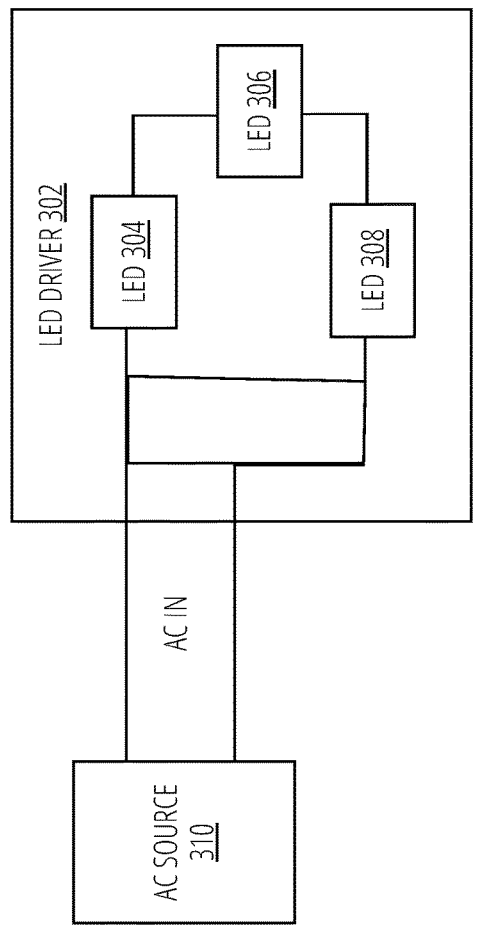
FIG. 3 illustrates an embodiment of a conventional linear LED driver system 300.

Referring to FIG. 3, the conventional linear LED driver system 300 comprises an LED driver 302, an LED 304, an LED 306, an LED 308, and an AC source 310.

The LED driver 302 comprises circuitry that couples the LED 304, the LED 306, and the LED 308 to the AC source 310. The alternating current provided by the AC source 310 is utilized to operate the LED 304, the LED 306, and the LED 308. The circuitry of the LED driver 302 may be utilized to control the operation of the LED 304, the LED 306, and the LED 308.

Figure 4:
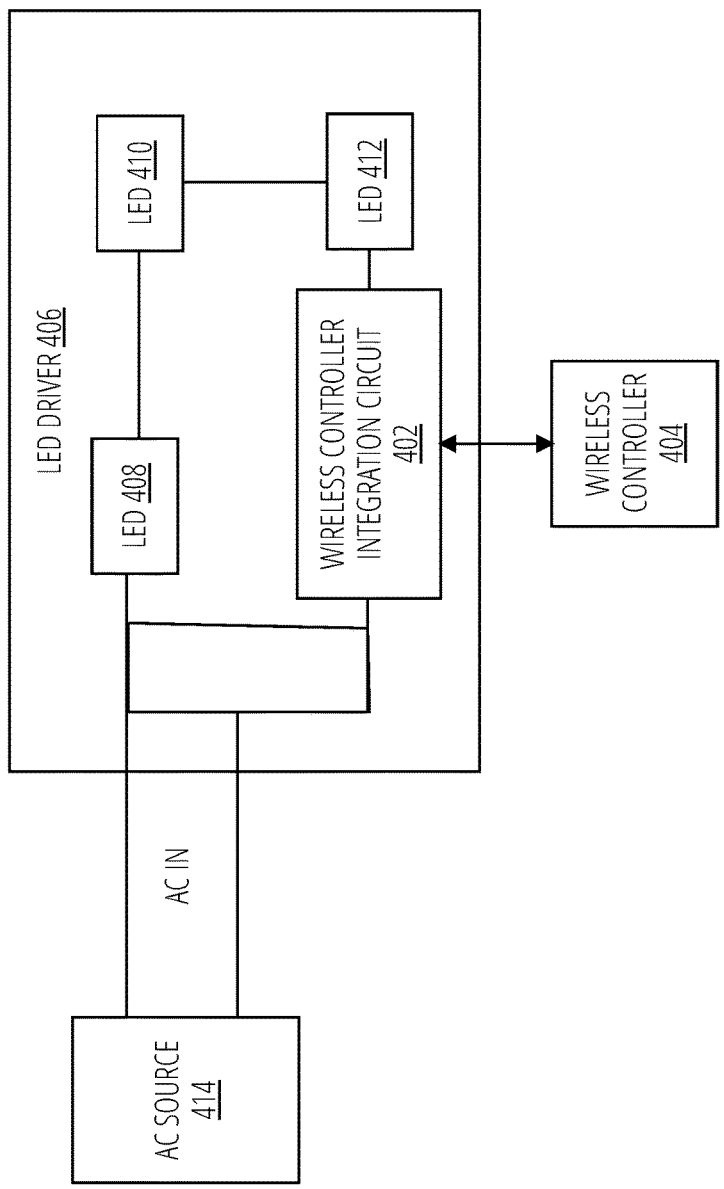
FIG. 4 illustrates an embodiment of a wireless-controlled linear LED driver system 400.

Referencing FIG. 4, an embodiment of an improved wireless-controlled linear LED driver system 400 comprises a wireless controller integration circuit 402, a wireless controller 404, an LED driver 406, an LED 408, an LED 410, an LED 412, and an AC source 414.

The LED driver 406 comprises circuitry that couples the LED 408, the LED 410, and the LED 412 to the AC source 414. The alternating current provided by the AC source 414 is utilized to operate the LED 408, the LED 410, and the LED 412. The circuitry of the LED driver 406 may also couple to the wireless controller integration circuit 402, which may have multiple states that influence the operation of the wireless-controlled linear LED driver system 400. The wireless controller integration circuit 402 may be further couple to the wireless controller 404. The wireless controller 404 may be utilized to control the operation of the wireless controller integration circuit 402 by transitioning the wireless controller integration circuit 402 into another state. The current received by the LED 408, the LED 410, and the LED 412 is then controlled by the state of the wireless controller integration circuit 402. The LED 408, the LED 410, and the LED 412 then may have their operation altered by the state of the wireless controller integration circuit 402. The wireless controller integration circuit 402 may be electrically coupled to the LED 408, the LED 410, and the LED 412 in series or in parallel. The wireless controller 404 may be incorporated into a wireless mesh network or a real time operation system. The wireless controller integration circuit 402 may be configured to receive control signals from a wireless mess network, wireless network, wireless personal area network, cellular communication network, low power wide area network, near field communication network, or machine-to-machine protocol. The wireless-controlled linear LED driver system 400 may be operated without direct current, either provided from a source or converted from the AC source 414.

Figure 5:
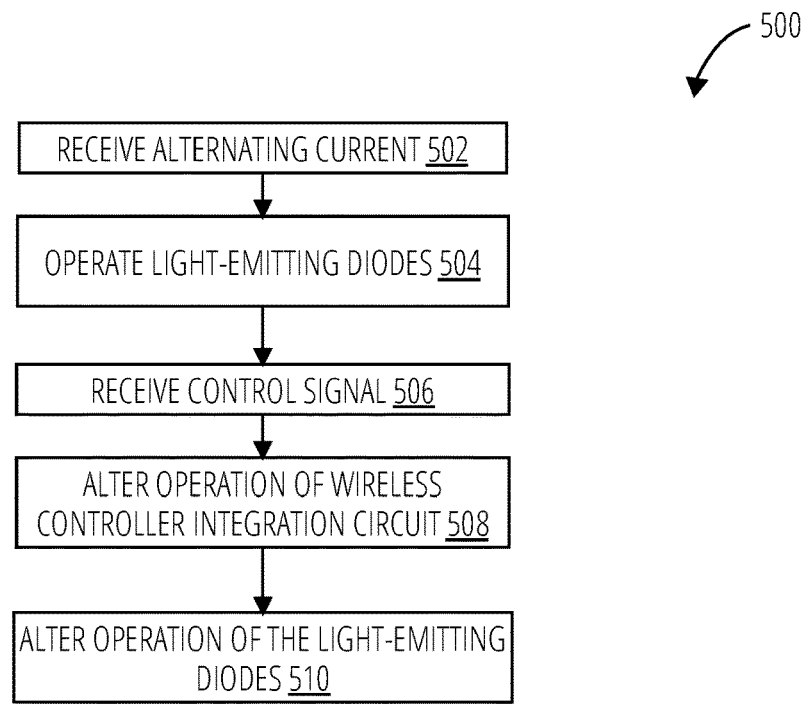
FIG. 5 illustrates an embodiment of a linear LED driver system operation process 500.

Referring to FIG. 5, the linear LED driver system operation process 500 receives an alternating current (AC) (block 502). The AC may be provided from an AC source. The LEDs are operated by the AC via the linear LED driver system (block 504). A control signal is then received from a wireless controller by a wireless controller integration circuit (block 506). The control signal alters the operation of the wireless controller integration circuit (block 508). In response, the operation of the LEDs is altered via the linear LED driver system (block 510).

Figure 6:
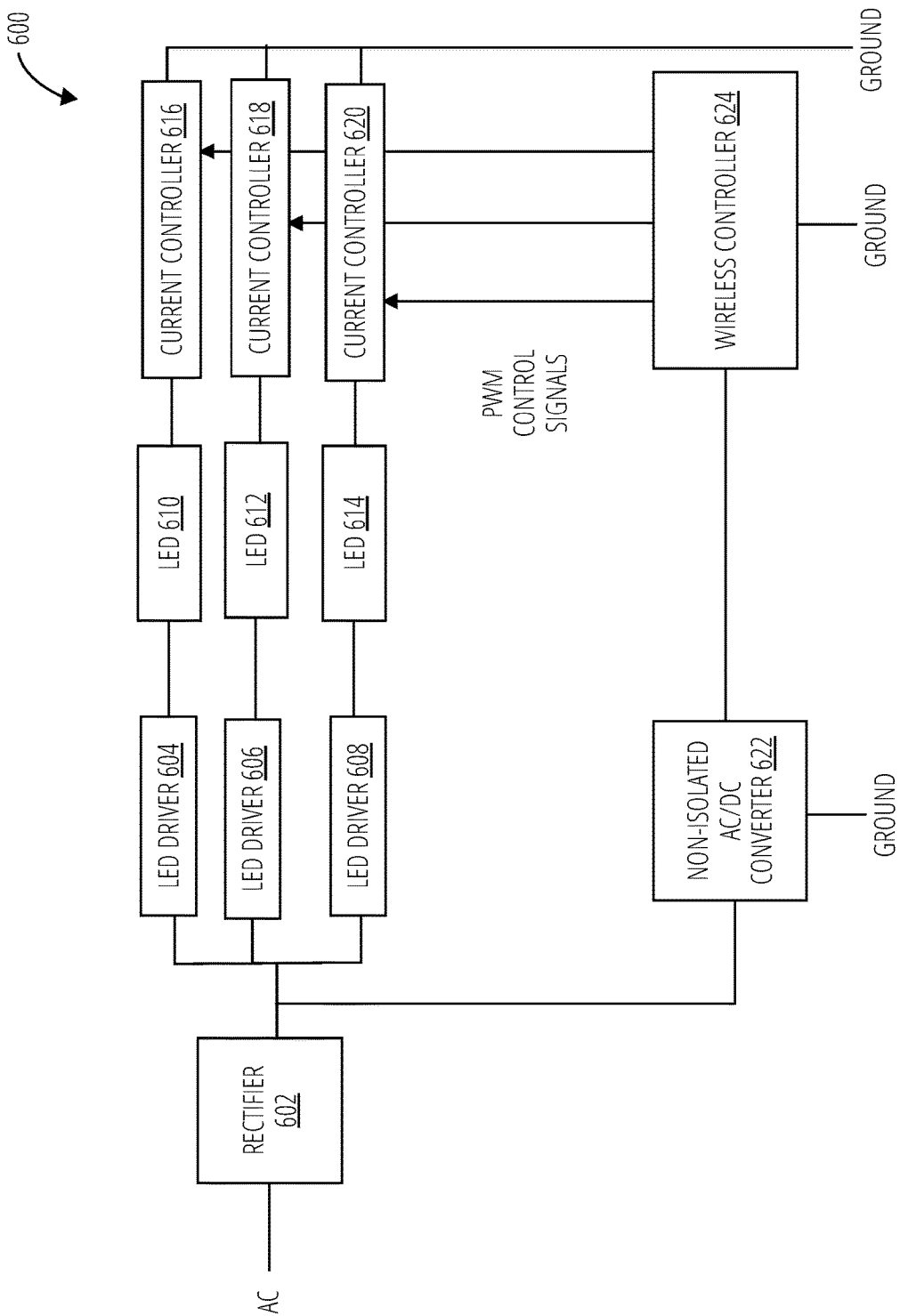
FIG. 6 illustrates an embodiment of an LED driver system 600.

Referring to FIG. 6, an LED driver system 600 comprises a rectifier 602, an LED driver 604, an LED driver 606, an LED driver 608, an LED 610, an LED 612, an LED 614, a current controller 616, a current controller 618, a current controller 620, a non-isolated AC/DC converter 622, and a wireless controller 624.

The LED driver system 600 may utilize constant current drivers, which are cost-effective, and pulse width modulation (PWM) switches to drive multiple branches of LEDs. The PWM pulse may be controlled to be synchronized to achieve low flicker and be able to utilize the constant current drivers.

The rectifier 602 receives AC from an AC source. The AC is converted to DC, which is then utilized by the LED driver 604, the LED driver 606, the LED driver 608, and the non-isolated AC/DC converter 622.

The LED drivers (i.e., the LED driver 604, the LED driver 606, and the LED driver 608) utilize the DC from the rectifier 602 to supply a constant current to the associated, electrically coupled LED (i.e., the LED 610, the LED 612, and the LED 614, respectively). The LED drivers provide sufficient current to light the LED, as well as limiting the current to inhibit damaging the LED. Each LED may have an LED driver. The constant current may be set as resistors in the LED driver. Each LED driver may further comprise a dimming control to set the brightness of the associated LED.

The LEDs (i.e., the LED 610, the LED 612, and the LED 614) are electrically coupled to the LED drivers and the current controllers (i.e., the current controller 616, the current controller 618, and the current controller 620, respectively). Each LED is operated (e.g., illuminated) through the operation of the associated current controller. An LED driver system 600 may have one or more LEDs. The multiple LED circuits may be different colors. For example, there may be a red LED, green LED, and a blue LED (i.e., RGB). The LED circuit may have a warm white LED and a cool white LED for color temperature tuning. Each LED may also be a single color (such as, white only); the utilization of multiple LED circuits thus enabling control of the flicker index through control of the phases of the PWM waveforms.

The current controllers (i.e., the current controller 616, the current controller 618, and the current controller 620) receive a control signal from the wireless controller 624 and operate in response. When operated, the current controllers enable current to flow through, and thus operate, the associated LED. The current controllers may be on/off switches controlled by PWM signals, which are generated by the wireless controller 624.

The non-isolated AC/DC converter 622 sends current from the rectifier 602 to the wireless controller 624. The non-isolated AC/DC converter 622 transforms the current to that which may enable the wireless controller 624 to operate.

The wireless controller 624 receives current from the non-isolated AC/DC converter 622 to operate. The wireless controller 624 may send PWM signals to one or more current controllers (i.e., the current controller 616, the current controller 618, and the current controller 620) to operate the associated one or more LEDs (i.e., the LED 610, the LED 612, and the LED 614). The frequency of the PWM signals may be made much lower than the bandwidth of the transient response of the driver circuit (e.g., below a threshold value). This may cause the constant current driver to respond to the on or off condition, instead of responding to the average of the PWM duty cycle. However, if the PWM signal frequency is too low (e.g., below a threshold), the LEDs may appear to flicker. To inhibit the appearance of flickering, multiple LED circuits may be utilized, and each of the LED circuits may be controlled by a PWM signal with a different phase than the other PWM signals. Exemplary waveforms with differing phases, as well as offset, are depicted in FIG. 7.

Figure 7:
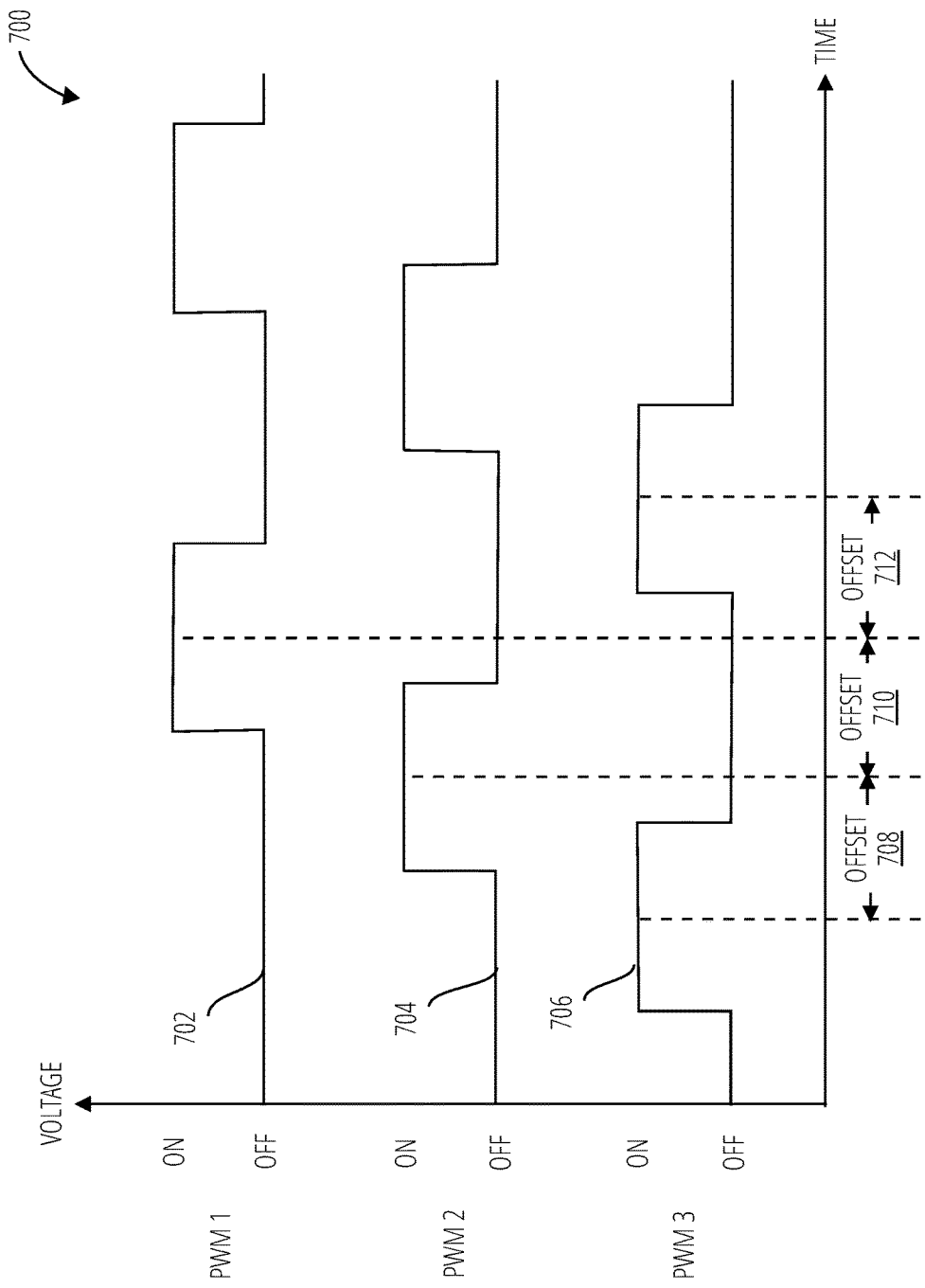
FIG. 7 illustrates an embodiment of a PWM signal diagram 700.

Referring to FIG. 7, a PWM signal diagram 700 comprises a PWM signal 702, a PWM signal 704, a PWM signal 706, an offset 708, an offset 710, and an offset 712. Each of the PWM signal may have a different phase (i.e., they are out-of-phase of one another). That is, they are not "off" or "on" for the same times. There is also an offset between a PWM signal and the next PWM signal. One measure of offset is the time from the midpoint of the "on" condition of one of the PWM signals to the time of the midpoint of the "on" condition of another of the PWM signals. The offset 708 is the offset between the PWM signal 706 and the PWM signal 704, the offset 710 is the offset between the PWM signal 704 and the PWM signal 702, and the offset 712 is the offset between the PWM signal 702 and the PWM signal 706. By creating offsets between each LED branches, there may be minimal time when all LEDs are off, and, thus, the overall visible flicker may be reduced. As depicted in FIG. 7, based on the offsets and the pulse width, each signal overlaps with another signal in the "on" condition. Other embodiments may have more overlap, overlap more than two signals, or have a gap period of time between the signals. The duration of the gap period of time may be of or less than a time period in which flicker (all signals have "off" condition) may not be apparent. Further, this PWM signal mechanism produces color mixing (overlapping multiple colors) or color temperature tuning (overlapping cool white LEDs and warm white LEDs).

Figure 8:
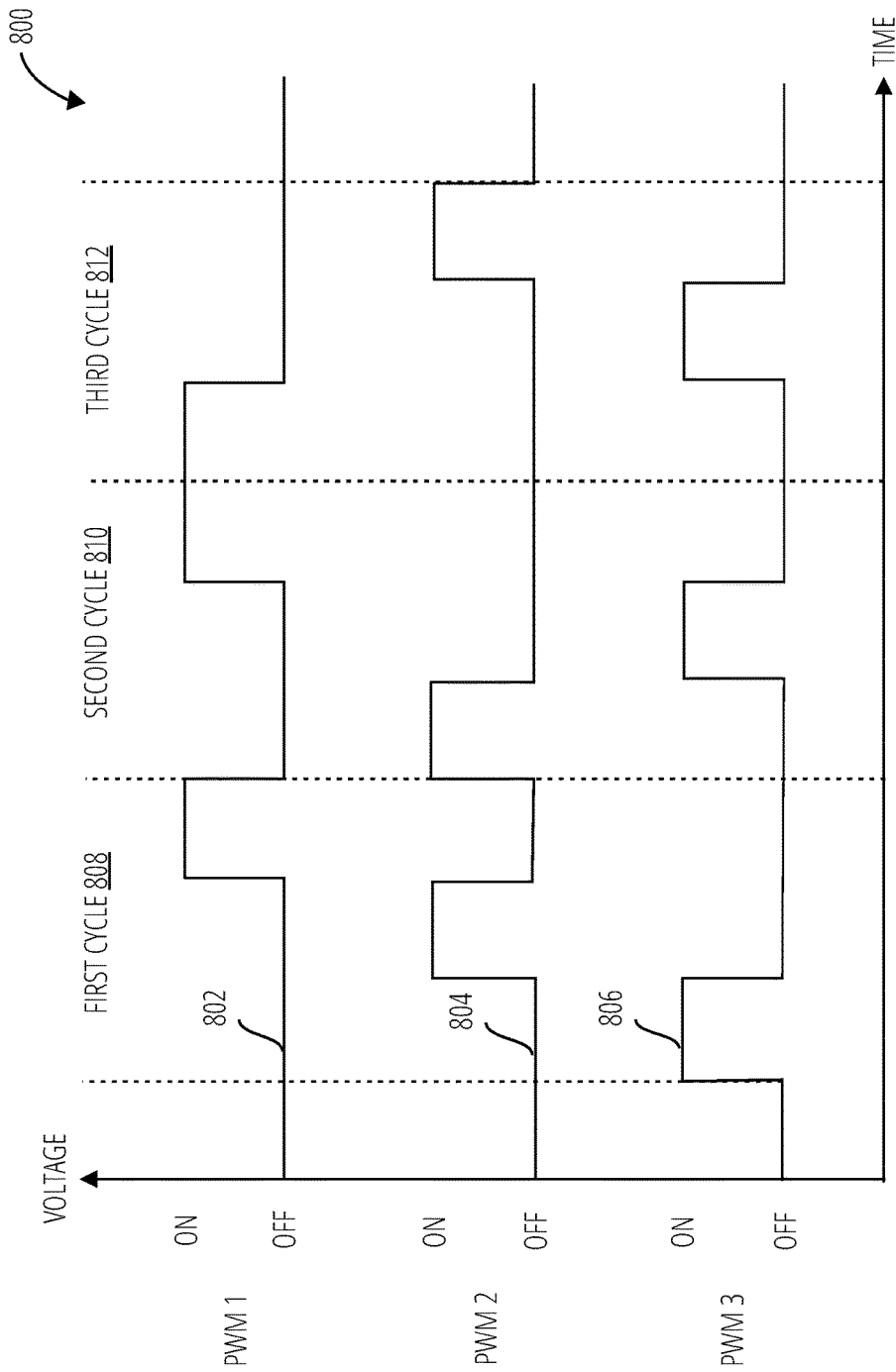
FIG. 8 illustrates an embodiment of a PWM signal diagram 800.

Referring to FIG. 8, a PWM signal diagram 800 comprises a PWM signal 802, a PWM signal 804, a PWM signal 806, a first cycle 808, a second cycle 810, and a third cycle 812. Each of the PWM signals may have a different phase (i.e., they are out-of-phase of one another). That is, they are not "off" or "on" for the same times. Additionally, the relative phases of the PWM control signals may be randomized instead of periodic. The duty cycle (i.e., the fraction of one period in which a signal or system is active) of each of the PWM signals remains the same; however, the phase of each PWM waveform may change relative to each other from one cycle to the next. For example, during the first cycle 808, the PWM signal 806 has a first phase; the PWM signal 804 has a second phase; and the PWM signal 802 has a third phase. During the second cycle 810, the PWM signal 804 has the first phase; the PWM signal 806 has the second phase; and the PWM signal 802 has the third phase. During the third cycle 812, the PWM signal 802 has the first phase; the PWM signal 806 has the second phase; and the PWM signal 804 has the third phase. The end result is that the light output may have less perceptible flicker, and, because of the randomized pattern and hence an effectively longer repetition cycle, the stroboscopic effect that is often exhibited by LED lights when viewed through a digital camera that captures images with a certain frame rate is inhibited.

Figure 9:
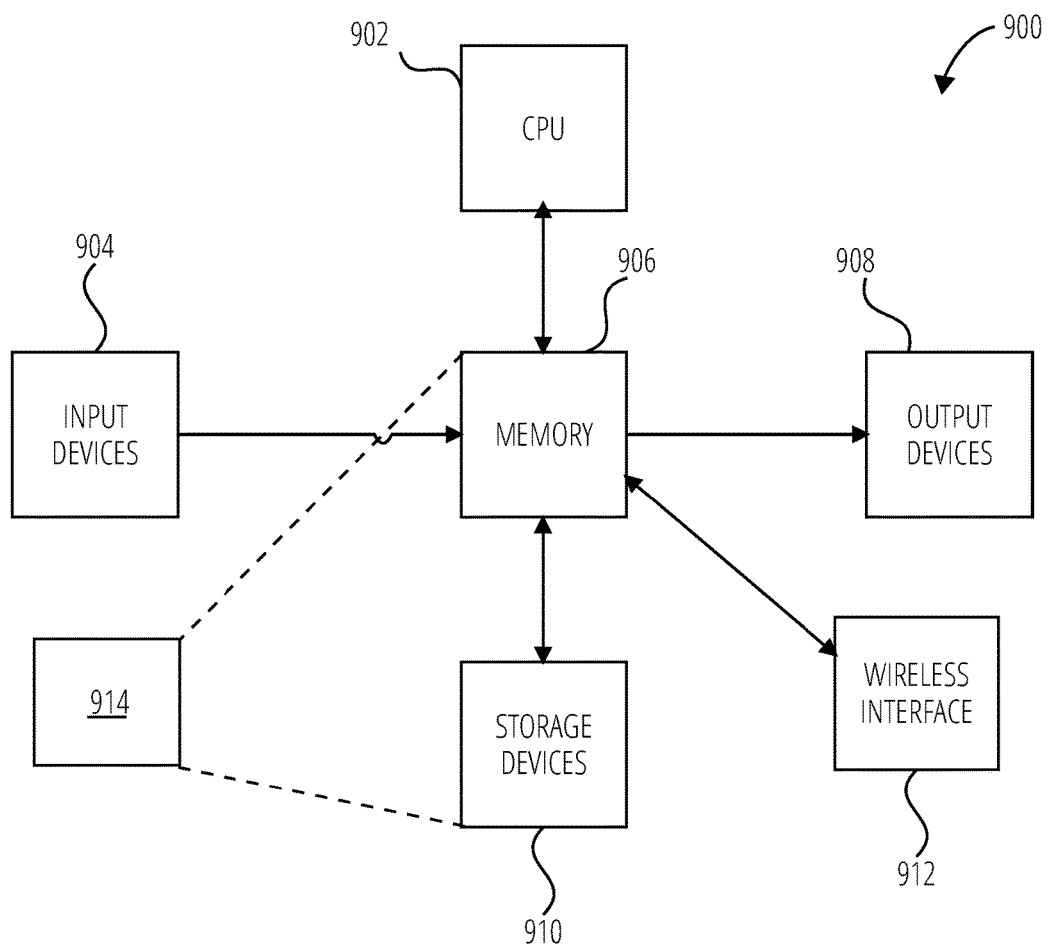
FIG. 9 illustrates an embodiment of a digital apparatus 900 to implement components and process steps of the system described herein.

FIG. 9 illustrates an embodiment of a digital apparatus 900 to implement components and process steps of the system described herein.

Input devices 904 comprise transducers that convert physical phenomenon into machine internal signals, typically electrical, optical or magnetic signals. Input devices 904 are well known in the art and vary according the implementation. Input signals may in some cases be wireless in the form of electromagnetic radiation in the radio frequency (RF) range but also potentially in the infrared or optical range. The signals from the input devices 904 are provided via various machine signal conductors (e.g., busses) and circuits to memory 906.

The memory 906 is typically what is known as a first or second level memory device, providing for storage (via configuration of matter or states of matter) of signals received from the input devices 904, instructions and information for controlling operation of the CPU 902, and signals from storage devices 910.

The memory 906 and/or the storage devices 910 may store computer-executable instructions and thus forming logic 914 that when applied to and executed by the CPU 902 implement embodiments of the processes disclosed herein, e.g., linear LED driver system operation process 500 carried out by wireless controller integration circuit 402.

Information stored in the memory 906 is typically directly accessible to the CPU 902 of the device. Signals input to the device cause the reconfiguration of the internal material/ energy state of the memory 906, creating in essence a new machine configuration, influencing the behavior of the digital apparatus 900 by affecting the behavior of the CPU 902 with control signals (instructions) and data provided in conjunction with the control signals.

Second or third level storage devices 910 may provide a slower but higher capacity machine memory capability. Examples of storage devices 910 are hard disks, optical disks, large capacity flash memories or other non-volatile memory technologies, and magnetic memories.

The CPU 902 may cause the configuration of the memory 906 to be altered by signals in storage devices 910. In other words, the CPU 902 may cause data and instructions to be read from storage devices 910 in the memory 906 from which may then influence the operations of CPU 902 as instructions and data signals, and from which it may also be provided to the output devices 908. The CPU 902 may alter the content of the memory 906 by signaling to a machine interface of memory 906 to alter the internal configuration, and then converted signals to the storage devices 910 to alter its material internal configuration. In other words, data and instructions may be backed up from memory 906, which is often volatile, to storage devices 910, which are often non-volatile.

Output devices 908 are transducers which convert signals received from the memory 906 into physical phenomenon such as vibrations in the air, or patterns of light (e.g., LEDs).

The wireless interface 912 receives signals from the memory 906 and converts them into electrical, optical, or wireless signals to other machines over a wireless communication channel. The wireless interface 912 also receives signals from the wireless communication channel and converts them into signals to the memory 906.

Those having skill in the art will appreciate that there are various logic implementations by which processes and/or systems described herein can be effected (e.g., hardware, software, or firmware), and that the preferred vehicle will vary with the context in which the processes are deployed. If an implementer determines that speed and accuracy are paramount, the implementer may opt for a hardware or firmware implementation; alternatively, if flexibility is paramount, the implementer may opt for a solely software implementation; or, yet again alternatively, the implementer may opt for some combination of hardware, software, or firmware. Hence, there are numerous possible implementations by which the processes described herein may be effected, none of which is inherently superior to the other in that any vehicle to be utilized is a choice dependent upon the context in which the implementation will be deployed and the specific concerns (e.g., speed, flexibility, or predictability) of the implementer, any of which may vary. Those skilled in the art will recognize that optical aspects of implementations may involve optically-oriented hardware, software, and or firmware.

Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein. The techniques and procedures described herein may be implemented via logic distributed in one or more computing devices. The particular distribution and choice of logic will vary according to implementation.

The foregoing detailed description has set forth various embodiments of the devices or processes via the use of block diagrams, flowcharts, or examples. Insofar as such block diagrams, flowcharts, or examples contain one or more functions or operations, it will be understood as notorious by those within the art that each function or operation within such block diagrams, flowcharts, or examples can be implemented, individually or collectively, by a wide range of hardware, software, firmware, or virtually any combination thereof. Portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more processing devices (e.g., as one or more programs running on one or more computer systems), as one or more programs running on one or more processors (e.g., as one or more programs running on one or more microprocessors), as firmware, or as virtually any combination thereof, and that designing the circuitry or writing the code for the software or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, flash drives, SD cards, solid state fixed or removable storage, and computer memory.

In a general sense, those skilled in the art will recognize that the various aspects described herein which can be implemented, individually or collectively, by a wide range of hardware, software, firmware, or any combination thereof can be viewed as being composed of various types of circuitry.

Those skilled in the art will recognize that it is common within the art to describe devices or processes in the fashion set forth herein, and thereafter use standard engineering practices to integrate such described devices or processes into larger systems. At least a portion of the devices or processes described herein can be integrated into a network processing system via a reasonable amount of experimentation. Various embodiments are described herein and presented by way of example and not limitation.

References to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. Any terms not expressly defined herein have their conventional meaning as commonly understood by those having skill in the relevant art(s).

"Circuitry" in this context refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes or devices described herein, or a microprocessor configured by a computer program which at least partially carries out processes or devices described herein), circuitry forming a memory device (e.g., forms of random access memory), or circuitry forming a communications device (e.g., a modem, communications switch, or optical-electrical equipment).

"Firmware" in this context refers to software logic embodied as processor-executable instructions stored in read-only memories or media.

"Hardware" in this context refers to logic embodied as analog or digital circuitry.

"Logic" in this context refers to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"Programmable device" in this context refers to an integrated circuit designed to be configured and/or reconfigured after manufacturing. The term "programmable processor" is another name for a programmable device herein. Programmable devices may include programmable processors, such as field programmable gate arrays (FPGAs), configurable hardware logic (CHL), and/or any other type programmable devices. Configuration of the programmable device is generally specified using a computer code or data such as a hardware description language (HDL), such as for example Verilog, VHDL, or the like. A programmable device may include an array of programmable logic blocks and a hierarchy of reconfigurable interconnects that allow the programmable logic blocks to be coupled to each other according to the descriptions in the HDL code. Each of the programmable logic blocks may be configured to perform complex combinational functions, or merely simple logic gates, such as AND, and XOR logic blocks. In most FPGAs, logic blocks also include memory elements, which may be simple latches, flip-flops, hereinafter also referred to as "flops," or more complex blocks of memory. Depending on the length of the interconnections between different logic blocks, signals may arrive at input terminals of the logic blocks at different times.

"Software" in this context refers to logic implemented as processor-executable instructions in a machine memory (e.g. read/write volatile or nonvolatile memory or media).

"Alternating current" in this context refers to an electric current that reverses its direction many times a second at regular intervals, typically used in power supplies.

"Constant current" in this context refers to the ability to vary the voltage across an electronic circuit to maintain a constant electric current.

"Dimming control" in this context refers to device connected to a light fixture and used to lower the brightness of light by changing the voltage waveform.

"Direct current" in this context refers to an electric current flowing in one direction only.

"Gap period of time" in this context refers to a period of time for one or more pulse width modulated signals when each of the signals is in the "off" state.

"Light emitting diode" in this context refers to a two-lead semiconductor light source.

"Offset" in this context refers to a measure of the phase difference of two pulse width modulated signals.

"Pulse width modulated signals" in this context refers to signals sent utilizing a modulation technique to encode a message into the pulsing signal.

"Rectifier" in this context refers to an electrical device that converts an alternating current into a direct one by allowing a current to flow through it in one direction only.

"Switch" in this context refers to an electrical component that can "make" or "break" an electrical circuit, interrupting the current or diverting it from one conductor to another.

"Apparent flicker" in this context refers to visible change in brightness of a light source due to rapid fluctuations in the voltage of the power supply.

"6LowPAN" in this context refers to an acronym of IPv6 (Internet Protocol Version 6) over Low power Wireless Personal Area Networks. It is a wireless standard for low-power radio communication applications that need wireless internet connectivity at lower data rates for devices with limited form factor. 6LoWPAN utilizes the RFC6282 standard for header compression and fragmentation. This protocol is used over a variety of networking media including Bluetooth Smart (2.4 GHz) or ZigBee or low-power RF (sub-1 GHz) and as such, the data rates and range may differ based on what networking media is used.

"Bluetooth Low-Energy (BLE)—or Bluetooth Smart" in this context refers to a wireless personal area network technology aimed at reduced power consumption and cost while maintaining a similar communication range as traditional Bluetooth. Like traditional Bluetooth, the frequency utilized is 2.4 GHz (ISM-Industrial, Scientific and Medical), the maximum range is generally 50-150 m with data rates up to 1 Mbps.

"Cellular" in this context refers to a communication network where the last link is wireless. The network is distributed over land areas called cells and utilizes one of the following standards GSM/GPRS/EDGE (2G), UMTS/HSPA (3G), LTE (4G). Frequencies are generally one of 900/1800/1900/2100 MHz. Ranges are 35 km max for GSM; 200 km max for HSPA and typical data download rates are: 35-170 kps (GPRS), 120-384 kbps (EDGE), 384 Kbps-2 Mbps (UMTS), 600 kbps-10 Mbps (HSPA), 3-10 Mbps (LTE).

"LoRaWAN" in this context refers to Low Power Wide Area Network, a media access control (MAC) protocol for wide area networks for low-cost, low-power, mobile, and secure bi-directional communication for large networks of up to millions of devices. LoRaWAN is employed on various frequencies, with a range of approximately 2-5 km (urban environment) to 15 km (suburban environment) and data rates of 0.3-50 kbps.

"NFC" in this context refers to "Near Field Communication" and is a subset of RFID (Radio Frequency Identifier) technology. NFC is standardized in ECMA-340 and ISO/IEC 18092. It employs electromagnetic induction between two loop antennae when NFC devices are within range (10 cm). NFC utilizes the frequency of 13.56 MHz (ISM). Data rates range from 106 to 424 kbit/s.

"SigFox" in this context refers to a cellular-style system that enables remote devices to connect using ultra-narrow band (UNB) technology and binary phase-shift keying (BPSK) to encode data. Utilizes the 900 MHz frequency and has a range of 30-50 km in rural environments and 3-10 km in urban environments with data rates from 10-1000 bps.

"Thread" in this context refers to a wireless mesh network standard that utilizes IEEE802.15.4 for the MAC (Media Access Control) and Physical layers, IETF IPv6 and 6LoWPAN (IVP6). Thread operates at 250 kbps in the 2.4 GHz band. The IEEE 802.15.4-2006 version of the specification is used for the Thread stack.

"Weightless" in this context refers to an open machine to machine protocol which spans the physical and mac layers. Operating frequency: 200 MHz to 1 GHz (900 MHz (ISM) 470-790 MHz (White Space)) Fractional bandwidth of spectrum band: <8% (for continuous tuning). Range up to 10 km and data Rates which range from a few bps up to 100 kbps "WiFi" in this context refers to a wireless network standard based on 802.11 family which consists of a series of half-duplex over-the-air modulation techniques that use the same basic protocol. Frequencies utilized include 2.4 GHz and 5 GHz bands with a range of approximately 50 m. Data rate of 600 Mbps maximum, but 150-200 Mbps is more typical, depending on channel frequency used and number of antennas (latest 802.11-ac standard should offer 500 Mbps to 1 Gbps).

"Z-Wave" in this context refers to a wireless standard for reliable, low-latency transmission of small data packets. The Z-Wave utilizes the Z-Wave Alliance ZAD12837/ITU-T G.9959 standards and operated over the 900 MHz frequency in the US (Part 15 unlicensed ISM) and is modulated by Manchester channel encoding. Z-Wave has a range of 30 m and data rates up to 100 kbit/s.

"ZigBee" in this context refers to a wireless networking standard for low power, low data rate, and lost cost applications. The Zigbee protocol builds upon the Institute of Electrical and Electronics Engineers (IEEE) 802.15.4 standard which defines a short range, low power, low data rate wireless interface for small devices that have constrained power, CPU, and memory resources. Zigbee operates over the 2.4 GHz frequency, with a range of 10-100 m and data rates of 250 kbps.

Herein various embodiments of a device and system and method(s) of operating the device and system are disclosed.

These embodiments may be operated within a mesh network environment (e.g., as nodes) using various wireless protocols and technologies, including those defined above.

What is claimed is:
1. A system comprising:
a rectifier electrically coupled to a plurality of light emitting diode circuits and a wireless controller to:
receive alternating current from an alternating current source; and convert the alternating current to direct current;
the plurality of light emitting diode circuits, each of the light emitting diode circuits comprising:
a light emitting diode driver to:
receive the direct current; and
maintain a constant current to the light emitting diode when a light emitting diode controller is operated by one or more pulse width modulated signals in an on condition;
a light emitting diode to operate in response to the constant current; and the light emitting diode controller to:
receive one of the one or more pulse width modulated signals from the wireless controller, each of the pulse width modulated signals having the on condition and an off condition;
enable the light emitting diode to operate during the on condition; and
inhibit the light emitting diode to operate during the off condition; and
the wireless controller to wirelessly send one of the pulse width modulated signals to each light emitting diode controller, each of the pulse width modulated signals having a different phase.

2. The system of claim 1, wherein the different phase of the pulse width modulated signals results in an offset, the offset and a width of the pulse width modulated signals operates the light emitting diode circuits such that at least one light emitting diode has the on condition at a time.

3. The system of claim 2, wherein the phase of each of the pulse width modulated signals is randomized during each cycle.

4. The system of claim 2, wherein the system comprises a red light emitting diode, a green light emitting diode, and blue light emitting diode, the offset and the width of the pulse width modulated signals operates the light emitting diode circuits such that at least two light emitting diodes has the on condition to produce color mixing.

5. The system of claim 2, wherein the system comprises a cool white light emitting diode and a warm white light emitting diode, the offset and the width of the pulse width modulated signals operates the light emitting diode circuits such that the cool white light emitting diode and the warm white light emitting diode has the on condition to produce color temperature tuning.

6. The system of claim 1, wherein the different phase of the pulse width modulated signals results in an offset, the offset and a width of the pulse width modulated signals operates the light emitting diode circuits such that there is a gap period of time between the on condition of one light emitting diode and a next light emitting diode.

7. The system of claim 6, wherein the gap period of time is below a threshold value such that the system does not produce apparent flicker.

8. The system of claim 6, wherein the gap period of time is above a threshold value such that the system does produce apparent flicker.

9. The system of claim 1, wherein the system has at least three of the light emitting diode circuits, a first light emitting diode circuit having a red light emitting diode, a second light emitting diode circuit having a green light emitting diode, and a third light emitting diode circuit having a blue light emitting diode.

10. The system of claim 1, wherein the system has at least two of the light emitting diode circuits, a first light emitting diode circuit having a cool white light emitting diode and a second light emitting diode circuit having a warm white light emitting diode.

11. The system of claim 1, wherein the pulse width modulated signals has a frequency less than a response time of the light emitting diode circuits to enable the light emitting diode circuits to respond to the on condition and the off condition of the pulse width modulated signals instead of an average of the pulse width modulated signals.

12. The system of claim 1, wherein the light emitting diode driver has a dimming control to set a brightness of the light emitting diode.

13. The system of claim 1, wherein the light emitting diode controller is a switch.

14. A method of operating a linear light-emitting diode driver system comprising:

receiving an alternating current from an alternating current source;

converting the alternating current to direct current;

operating light emitting diodes by the direct current via the linear light-emitting diode driver system, a wireless controller integration circuit in a first state;

receiving a control signal from a wireless controller at the wireless controller integration circuit;

altering the wireless controller integration circuit from the first state to a second state in response to the control signal; and altering operation of the light emitting diodes in response to the wireless controller integration circuit being in the second state.

15. The method of claim 14, wherein the wireless controller integration circuit alters the direct current received by the light emitting diodes when altered from the first state to the second state.

16. The method of claim 14, wherein multiple light emitting diodes are operated by out-of-phase controls signals, an offset of the out-of-phase controls signals and a pulse width of the out-of-phase controls signals operating to inhibit apparent flicker.

17. The method of claim 14, wherein the control signal is received from a wireless network.

18. The method of claim 14, wherein the control signal is received from a cellular communication network.

19. The method of claim 14, wherein the control signal is received from a low power wide area network.

20. The method of claim 14, wherein the control signal is received from a near field communications network.

* * * * *